United States Patent
Morein et al.

(10) Patent No.: US 9,582,128 B2
(45) Date of Patent: Feb. 28, 2017

(54) RESONATOR CIRCUIT FOR A MODULATED POWER SUPPLY

(71) Applicant: Synaptics Incorporated, San Jose, CA (US)

(72) Inventors: Stephen L. Morein, San Jose, CA (US); Petr Shepelev, San Jose, CA (US); Joseph Kurth Reynolds, Alviso, CA (US)

(73) Assignee: SYNAPTICS INCORPORATED, San Jose, CA (US)

(*) Notice: Subject to any disclaimer, the term of this patent is extended or adjusted under 35 U.S.C. 154(b) by 219 days.

(21) Appl. No.: 14/581,794

(22) Filed: Dec. 23, 2014

(65) Prior Publication Data

US 2016/0180814 A1   Jun. 23, 2016

(51) Int. Cl.
*G09G 5/00*  (2006.01)
*G06F 3/044*  (2006.01)
*G09G 3/20*  (2006.01)
*G09G 3/36*  (2006.01)

(52) U.S. Cl.
CPC .............. *G06F 3/044* (2013.01); *G09G 3/20* (2013.01); *G09G 3/3696* (2013.01); *G09G 2300/0426* (2013.01); *G09G 2300/08* (2013.01); *G09G 2330/02* (2013.01); *G09G 2330/024* (2013.01); *G09G 2330/028* (2013.01)

(58) Field of Classification Search
CPC .. G06F 3/04; G09G 2320/02; G09G 2320/04; G09G 3/32; G09G 1/005; G09G 2330/024; G09G 2300/0426; G09G 5/18

USPC .......................................... 345/174, 211–213
See application file for complete search history.

(56) References Cited

U.S. PATENT DOCUMENTS

| | | | |
|---|---|---|---|
| 4,550,310 | A | 10/1985 | Yamaguchi et al. |
| 6,054,979 | A | 4/2000 | Sellers |
| 7,859,521 | B2 | 12/2010 | Hotelling et al. |
| 8,243,027 | B2 | 8/2012 | Hotelling et al. |
| 8,258,986 | B2 | 9/2012 | Makovetskyy |
| 8,305,359 | B2 | 11/2012 | Bolender et al. |
| 8,766,950 | B1 | 7/2014 | Morein et al. |
| 2001/0006999 | A1 | 7/2001 | Konno et al. |
| 2008/0062140 | A1 | 3/2008 | Hotelling et al. |
| 2008/0062147 | A1 | 3/2008 | Hotelling et al. |
| 2008/0246723 | A1 | 10/2008 | Baumbach |
| 2010/0001973 | A1 | 1/2010 | Hotelling et al. |

(Continued)

*Primary Examiner* — Jennifer Nguyen
(74) *Attorney, Agent, or Firm* — Patterson + Sheridan, LLP

(57) ABSTRACT

Examples of the present disclosure generally provide a processing system for a display device including an integrated capacitive sensing device. The processing system includes a sensor module configured to be coupled to a plurality of sensor electrodes. Each sensor electrode includes at least one display electrode. The sensor module drives the plurality of sensor electrodes for capacitive sensing during a first period. The processing system further includes a display driver configured to drive display signals onto the display electrodes during a second period. The display signals are based on a reference voltage, and the first period and the second period are at least partially overlapping. The processing system further includes a power supply configured to provide the reference voltage to the display driver. The power supply includes a resonator circuit having an inductor connected in parallel with a capacitor and configured to modulate the reference voltage.

24 Claims, 9 Drawing Sheets

(56) References Cited

U.S. PATENT DOCUMENTS

| | | |
|---|---|---|
| 2010/0144391 A1 | 6/2010 | Chang et al. |
| 2010/0193257 A1 | 8/2010 | Hotelling et al. |
| 2010/0194695 A1 | 8/2010 | Hotelling et al. |
| 2010/0194697 A1 | 8/2010 | Hotelling et al. |
| 2010/0194707 A1* | 8/2010 | Hotelling ............. G06F 3/0412 345/173 |
| 2011/0007030 A1 | 1/2011 | Mo et al. |
| 2011/0025635 A1 | 2/2011 | Lee |
| 2011/0242444 A1 | 10/2011 | Song |
| 2011/0248949 A1 | 10/2011 | Chang et al. |
| 2011/0298746 A1 | 12/2011 | Hotelling |
| 2012/0038585 A1 | 2/2012 | Kim |
| 2012/0162133 A1 | 6/2012 | Chen et al. |
| 2012/0218199 A1* | 8/2012 | Kim ..................... G06F 3/0412 345/173 |
| 2013/0057507 A1 | 3/2013 | Shin et al. |
| 2013/0088372 A1 | 4/2013 | Lundstrum et al. |
| 2013/0162570 A1 | 6/2013 | Shin et al. |
| 2013/0215075 A1 | 8/2013 | Lee et al. |
| 2013/0307820 A1 | 11/2013 | Kim |
| 2013/0314343 A1* | 11/2013 | Cho ..................... G06F 3/0412 345/173 |
| 2014/0132526 A1* | 5/2014 | Lee ..................... G06F 3/0412 345/173 |

\* cited by examiner

RESONATOR CIRCUIT FOR A MODULATED POWER SUPPLY

BACKGROUND OF THE INVENTION

Field of the Invention

Embodiments of the present disclosure generally relate to a resonator circuit for a modulated power supply of an input device.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location, and/or motion of one or more input objects. Proximity sensor devices may be used to provide interfaces for the electronic system. For example, proximity sensor devices are often used as input devices for larger computing systems, such as touchpads integrated in, or peripheral to, notebook or desktop computers. Proximity sensor devices are also often used in smaller computing systems, such as touch screens integrated in cellular phones or tablet computers.

Many proximity sensor devices utilize an array of sensor electrodes to measure changes in capacitance indicative of the presence of an input object, such as a finger or stylus, proximate the sensor electrodes. For example, in "matrix sensing" implementations, sensor electrodes arranged in a grid are operated to acquire a capacitive image of an input sensing region. In some matrix sensing implementations, the grid of sensor electrodes are driven for absolute capacitance sensing, where each sensor electrodes may be driven with a signal to determine a degree of capacitive coupling between the sensor electrode and an input object.

However, sensor electrodes driven for absolute capacitance sensing may form parasitic capacitances with other components included in (or near) an input device. For example, conductive objects included in an input device proximate to the sensor electrodes may affect capacitance measurements acquired by the sensor electrodes, reducing the ability to detect the presence of an input object. Such issues are particularly problematic in common electrode implementations—where sensor electrodes are used to perform both input sensing and display updating—since the sensor electrodes are often positioned close to other conductive elements, such as pixel electrodes included in a display device.

Accordingly, there is a need for improving the operation of various types of proximity sensor devices.

SUMMARY OF THE INVENTION

Embodiments of the present disclosure generally provide a processing system for a display device including an integrated capacitive sensing device. The processing system includes a sensor module configured to be coupled to a plurality of sensor electrodes. Each sensor electrode included in the plurality of sensor electrodes includes at least one display electrode included in a plurality of display electrodes of the display device. The sensor module drives the plurality of sensor electrodes for capacitive sensing during a first period. The processing system further includes a display driver configured to drive display signals onto the display electrodes during a second period. The display signals are based on a reference voltage, and the first period and the second period are at least partially overlapping. The processing system further includes a power supply configured to provide the reference voltage to the display driver. The power supply includes a resonator circuit having an inductor connected in parallel with a capacitor. The resonator circuit is configured to modulate the reference voltage.

Embodiments of the present disclosure may further provide a display device including an integrated capacitive sensing device. The display device includes a plurality of sensor electrodes. Each sensor electrode included in the plurality of sensor electrodes includes at least one display electrode included in a plurality of display electrodes of the display device. The display device further includes a processing system coupled to the plurality of sensor electrodes. The processing system is configured to drive the plurality of sensor electrodes for capacitive sensing during a first period, and drive display signals onto the display electrodes during a second period. The display signals are based on a reference voltage, and the first period and the second period are at least partially overlapping. The display device further includes a power supply configured to provide the reference voltage to the processing system. The power supply includes a resonator circuit having an inductor connected in parallel with a capacitor. The resonator circuit is configured to modulate the reference voltage.

Embodiments of the present disclosure may further provide a method of performing display updating with a display device including an integrated capacitive sensing device. The method includes driving a capacitive sensing signal onto a plurality of sensor electrodes during a first period. Each sensor electrode included in the plurality of sensor electrodes includes at least one display electrode included in a plurality of display electrodes of the display device. The method further includes modulating a reference voltage via a resonator circuit, the resonator circuit having an inductor connected in parallel with a capacitor. The method further includes adjusting at least one of a capacitance of the capacitor and an inductance of the inductor to control a frequency of the resonator circuit. The method further includes driving display update signals onto the display electrodes to update the display device during a second period. The display signals are based on the reference voltage, and the first period and the second period are at least partially overlapping.

BRIEF DESCRIPTION OF THE DRAWINGS

So that the manner in which the above recited features can be understood in detail, a more particular description, briefly summarized above, may be had by reference to embodiments, some of which are illustrated in the appended drawings. It is to be noted, however, that the appended drawings illustrate only embodiments of the invention and are therefore not to be considered limiting of its scope, for the invention may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present disclosure generally provide a system and method for modulating one or more signals included in a power supply in order to reduce the capacitive coupling between input sensing components and other components (e.g., display components) included in an input device. Additionally, the efficiency and quality of modulated signals outputted by the power supply may be improved by including a resonator circuit in a power supply, where the resonant frequency of the resonator circuit is substantially similar to the desired frequency of the modulated signals.

Figure 1:
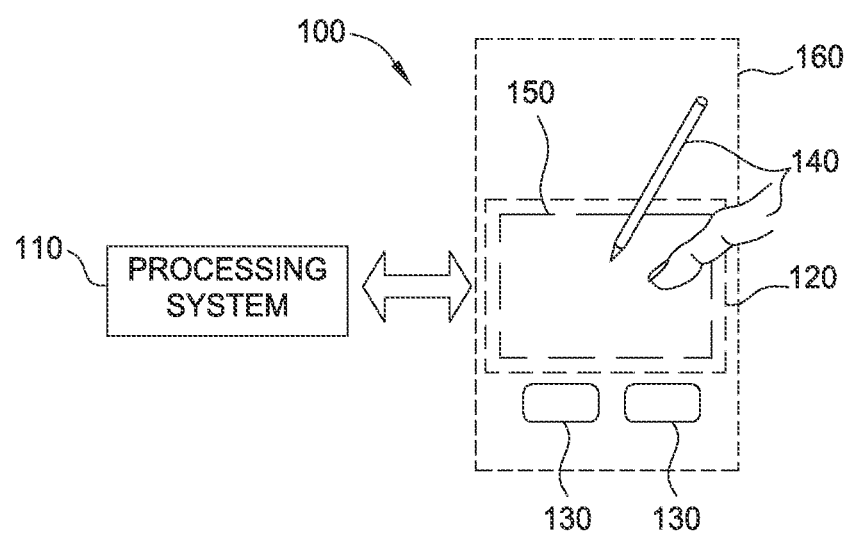
FIG. 1 is a block diagram of an exemplary input device in accordance with embodiments of the disclosure.

Turning now to the figures, FIG. 1 is a block diagram of an exemplary input device 100 in accordance with embodiments of the disclosure. The input device 100 comprises a display device 160 having an integrated sensing device, such as a capacitive sensing device. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include $I^2C$, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitters or receivers, or may be configured to both transmit and receive.

In some touch screen embodiments, transmitter electrodes comprise one or more common electrodes (e.g., "V-com electrode") used in updating the display (e.g., display lines) of the display screen. These common electrodes may be disposed on an appropriate display screen substrate. For example, the common electrodes may be disposed on the TFT glass in some display screens (e.g., in-plane switching (IPS) or plane-to-line switching (PLS)), on the bottom of the color filter glass of some display screens (e.g., patterned vertical alignment (PVA) or multi-domain vertical alignment (MVA)), configured to drive an organic light emitting diode OLED display, etc. In such embodiments, the common electrode can also be referred to as a "combination electrode," since it performs multiple functions. In various embodiments, two or more transmitter electrodes may share one or more common electrodes. In addition, other display elements, such as source drivers, gate select lines, storage capacitors, and the like, may be used to perform capacitive sensing.

In other touch screen embodiments, the sensing elements 150 may be formed as discrete geometric forms, polygons, bars, pads, lines, or other shapes that are ohmically isolated from one another. When formed as discrete geometric elements, the sensing elements 150 may be driven using absolute sensing and/or transcapacitance sensing methods. The sensing elements 150 may be electrically coupled through circuitry to form electrodes of having larger plan area relative to the individual sensing elements 150. The sensing elements 150 may be formed as a contiguous body of conductive material having little or no open area (i.e., having a planar surface uninterrupted by holes) or may alternatively be fabricated to form a body of material having openings formed therethrough. For example, the sensing elements 150 may be formed from a mesh of conductive material, such as a plurality of interconnected thin metal wires. Additionally, the sensing electrodes 150 may include a grid electrode. The grid electrode may be disposed between at least two discrete sensing elements 150 and/or may at least partially circumscribe one or more discrete sensing elements 150. In some embodiments, the grid electrode may be a planar body having a plurality of apertures, where each aperture circumscribes a discrete sensing element 150. The grid electrode may also be segmented.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing. As another example, the display screen may be operated in part or in total by the processing system 110.

It should be understood that while many embodiments of the disclosure are described in the context of a fully functioning apparatus, the mechanisms of the present disclosure are capable of being distributed as a program product (e.g., software) in a variety of forms. For example, the mechanisms of the present disclosure may be implemented and distributed as a software program on information bearing media that are readable by electronic processors (e.g., non-transitory computer-readable and/or recordable/writable information bearing media readable by the processing system 110). Additionally, the embodiments of the present disclosure apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
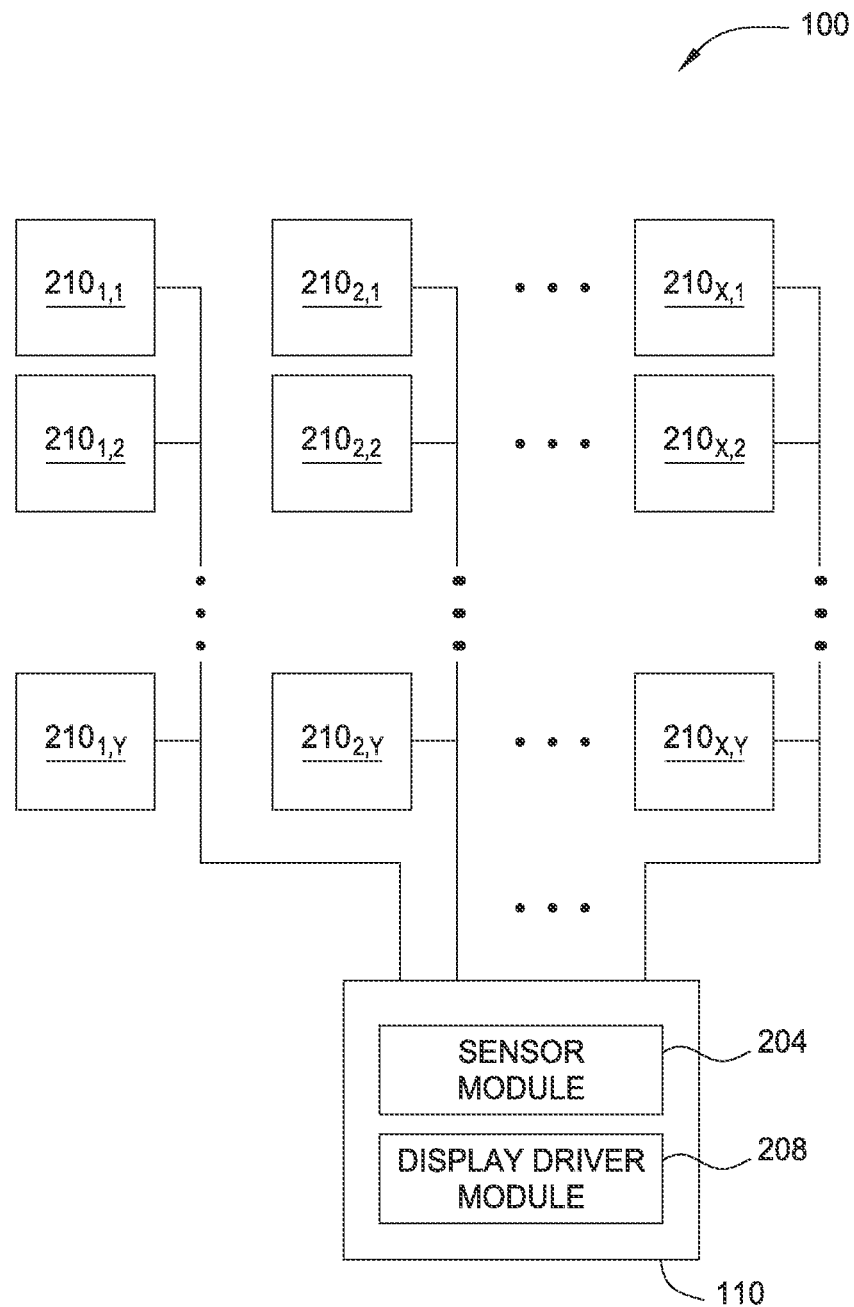
FIG. 2A is a partial schematic plan view of the input device of FIG. 1 in accordance with embodiments of the disclosure.

FIG. 2A is a partial schematic plan view of the input device 100 of FIG. 1 in accordance with embodiments of the disclosure. The input device 100 includes an array of sensing elements 150 and processing system 110. The array of sensing elements 150 includes a plurality of sensor electrodes 210 configured to detect the presence (or lack thereof) and/or location of an input object 140 in the sensing region 120. Each sensor electrode 210 may comprise one or more common electrodes. For clarity of illustration and description, FIG. 2A omits various components and depicts the sensor electrodes 210 arranged in X columns and Y rows. However, it is contemplated that the sensor electrodes 210 may be arranged in other configurations, such as polar arrays, repeating patterns, non-repeating patterns, one or more row(s) and/or one or more column(s), or any other suitable arrangement. Additionally, as described above, the sensor electrodes 210 may be any practical geometric shape.

The sensor electrodes 210 may be formed on a substrate that is external to the display device 160. For example, the sensor electrodes 210 may be disposed on the outer surface of a lens of the input device 100, between the color filter glass of the display device 160 and the lens of the input device 100, or between a thin film transistor substrate (TFT substrate) and the color filter glass of the display device 160. Further, the sensor electrodes 210 may include one or more common electrodes, such as one or more segments of a Vcom electrode, a source line, gate line, an anode sub-pixel electrode, cathode pixel electrode, or any other display element that is used for both display updating and input sensing.

Although the processing system 110 is illustrated in FIG. 2A embodied as a single integrated circuit (IC) (e.g., an integrated controller), the processing system 110 may include any appropriate number of ICs. As shown in FIG. 2A, the processing system 110 may include a sensor module 204 and, optionally, a display driver module 208. However, other modules may be included in the processing system 110 to implement other functions of the input device 100.

The display driver module 208 includes driver circuitry and may be configured for updating images on the display screen of the display device 160. For example, the driver circuitry may be configured to apply one or more pixel voltages to the display pixel electrodes through pixel source drivers.

The sensor module 204 is coupled to the sensor electrodes 210 and configured to drive a capacitive sensing signal to the sensor electrodes 210. The capacitive sensing signal may have an amplitude, frequency, and voltage that may be changed to obtain more robust location information of an input object 140 in the sensing region 120. In yet another example, the sensor module 204 may be coupled to one or more of the sensor electrodes 210 and operate the sensor electrodes 210 in an absolute capacitance sensing mode and/or a transcapacitive sensing mode. The sensor module 204 may be further configured to receive resulting signals from one or more of the sensor electrodes 210 indicative of input (or lack of input) in the sensing region 120 and/or of environmental interference. The sensor module 204 may then process the resulting signals to determine the presence and/or location of an input object 140 in the sensing region 120. Additionally, the sensor module 204 and/or display driver module 208 may be configured to drive a modulated signal onto at least one sensor electrode 210 and detect changes in absolute capacitance between the at least one sensor electrode 210 and an input object 140. For example, in embodiments in which the sensor electrodes 210 comprise one or more common electrodes, the display driver module 208 may be configured to drive capacitive sensing signals onto the sensor electrodes 210.

The functions of the processing system 110 may be implemented in more than one IC to control the display device 160 elements (e.g., common electrodes) and drive input sensing signals and/or receive resulting signals received from the array of sensing elements 150. For example, one IC may be configured to perform input sensing and another IC may be configured to perform display updating. In other embodiments, one IC may be configured to perform the functions of the sensor module 204, and another IC may be configured to perform the functions of the display driver module 208. In embodiments where there is more than one IC, communications between separate ICs of the processing system 110 may be achieved through a synchronization mechanism, which sequences the signals provided to the common electrodes. Alternatively the synchronization mechanism may be internal to any one of the ICs. Additionally, input sensing data (e.g., resulting signals or at least partially processed resulting signals) may be processed by a separate integrated controller, such as a controller that also functions as the timing controller for a display device.

In a first mode of operation, the sensor electrodes 210 (210-1, 210-2, 210-3, . . . 210-n) may be utilized to detect the presence of an input object 140 via absolute capacitance sensing techniques. For example, processing system 110 may be configured to drive each sensor electrode 210 with a capacitive sensing signal (e.g., a modulated signal) and receive a resulting signal comprising effects corresponding to the capacitive sensing signal. The resulting signal may then be utilized by the processing system 110 or by another processor to determine the presence and/or position of an input object 140 within the sensing region 120.

In a second mode of operation, the sensor electrodes 210 may be utilized to detect the presence of an input object 140 via profile sensing techniques. For example, processing system 110 may be configured to drive the sensor electrodes 210 row-by-row and then column-by-column with input sensing signals. The resulting signals that are generated in response to driving the sensor electrodes 210 in this manner may then be used to determine the presence and/or position of an input object 140 within the sensing region 120.

In a third mode of operation, the sensor electrodes 210 may be divided into groups of transmitter electrodes and receiver electrodes. The transmitter electrodes and receiver electrodes may then be driven via transcapacitive sensing techniques. For example, processing system 110 may drive a first group of sensor electrodes 210 with an input sensing signal and receive resulting signals with a second group of sensor electrodes 210. The resulting signals may then be utilized by the processing system 110 or by another processor to determine the presence and/or position of an input object 140 within the sensing region 120.

The input device 100 may be configured to operate in any one of the modes described above. Additionally, the input device 100 may be configured to switch between any of the modes described above while performing input sensing.

Sensor electrodes 210 are ohmically isolated from each other by one or more insulators which separate each sensor electrode 210 and prevent them from electrically shorting to each other. In some embodiments, the electrically insulative material may separate the sensor electrodes 210 at crossover areas at which the electrodes intersect. In one such configuration, the sensor electrodes 210 are formed with jumpers connecting different portions of the same sensor electrode 210. In other configurations, the sensor electrodes 210 are separated by one or more layers of electrically insulative material or by one or more substrates. In still other configurations, the sensor electrodes 210 may be disposed on a single layer of the input device 100.

The areas of localized capacitive coupling between sensor electrodes 210 configured as transmitter electrodes and sensor electrodes 210 configured as receiver electrodes may be termed "capacitive pixels." The capacitive coupling between the transmitter electrodes and receiver electrodes changes with the proximity and motion of input objects 140 in the sensing region 120. In other embodiments, such as embodiments that include matrix sensors, the term "capacitive pixels" may refer to the localized capacitance (e.g., absolute capacitance) between a sensor electrode 210 and an input object 140.

In some embodiments, the sensor pattern is "scanned" to determine these capacitive couplings. For example, sensor electrodes 210 configured as transmitter electrodes may be driven to transmit transmitter signals. Transmitter electrodes may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes to be independently determined. Additionally, in embodiments that implement absolute capacitive sensing techniques, the sensor electrodes 210 may be scanned in any order or operated such that one more sensor electrodes are simultaneously driven to sense changes to the absolute capacitance of the sensor electrodes 210.

The sensor electrodes 210 configured as receiver electrodes may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region 120. For example, successive capacitive images acquired over successive periods of time can be used to track the motion(s) of one or more input objects 140 entering, exiting, and within the sensing region 120.

In one or more embodiments, capacitive sensing and display updating may occur during at least partially overlapping periods. For example, as a common electrode is driven for display updating, the common electrode (and/or a sensor electrodes 210 coupled to the common electrode) may also be driven for capacitive sensing. In one embodiment a first common electrode proximate to a first portion of the display device 160 is driven for display updating and a second common electrode or electrodes proximate to a second portion of the display device 160 is driven for capacitive sensing, such that the capacitive sensing and display updating may occur during at least partially overlapping periods. In another embodiment, capacitive sensing and display updating may occur during non-overlapping periods, for example, when capacitive sensing is performed during non-display update periods. In various embodiments, the non-display update periods may occur between display line update periods for two display lines of a display frame and may be at least as long in time as the display update period. In such embodiments, the non-display update period may be referred to as a long horizontal blanking period, long h-blanking period, or a distributed blanking period. In other embodiments, the non-display update period may comprise horizontal blanking periods and vertical blanking periods. Processing system 110 may be configured to drive the sensor electrodes 210 for capacitive sensing during any combination of the non-display update time periods and/or display update time periods.

When sensor electrodes 210 are driven with modulated signals for capacitive sensing, nearby conductive components, such as routing traces and display circuitry, may form a capacitive coupling (often referred to as "parasitic capacitance") with the sensor electrodes 210. In general, parasitic capacitance between the sensor electrodes 210 and nearby components reduces the efficiency and accuracy of capacitive sensing. For example, parasitic capacitance between a sensor electrode 210 and nearby components may increase the amount of power required to drive a modulated signal onto a sensor electrode 210 during capacitive sensing. Additionally, parasitic capacitance may create artifacts in acquired capacitive images.

Modulated Power Supply for Reduced Parasitic Capacitance

In order to reduce parasitic capacitive couplings between the sensor electrodes 210 and nearby components, one or more power supplies included in the input device 100 may be configured to generate modulated power supply signal(s) and/or modulated ground signal(s). For example, the power supply signal(s) and/or ground signal(s) generated by a power supply may be modulated in a manner that is substantially similar to the manner in which one or more sensor electrodes 210 are modulated (e.g., with input sensing signals) during capacitive sensing. Accordingly, by modulating the sensor electrode(s) 210 and nearby components in a similar manner, parasitic capacitance between the sensor electrode(s) 210 and the nearby components may be reduced or eliminated. For example, parasitic capacitance between the sensor electrodes 210 and nearby components may be reduced because the voltage of the sensor electrodes 120 remains substantially constant relative to the voltage of nearby components.

Additionally, because the modulation waveform is applied to the ground signal of the power supply, components (e.g., display circuitry) that are being driven by the modulated power supply may continue to operate in a normal manner, since the voltage differential between the power signal outputted by the power supply and the ground signal outputted by the power supply will remain unchanged. Further, by modulating the ground signal of the power supply, the sensor electrodes 210 can be operated for capacitive sensing by simply maintaining the sensor electrodes 120 at the modulated ground voltage. For example, since an input object 140 is generally at earth ground, the voltage differential between the sensor electrodes 210 (e.g., held at the modulated ground voltage) and the input object 140 will vary, enabling capacitive sensing to be performed while also reducing parasitic losses to and/or interference with nearby components. In some embodiments, the ground signal of the power supply is modulated only during capacitive sensing time periods and is not modulated during display updating.

Figure 2B:
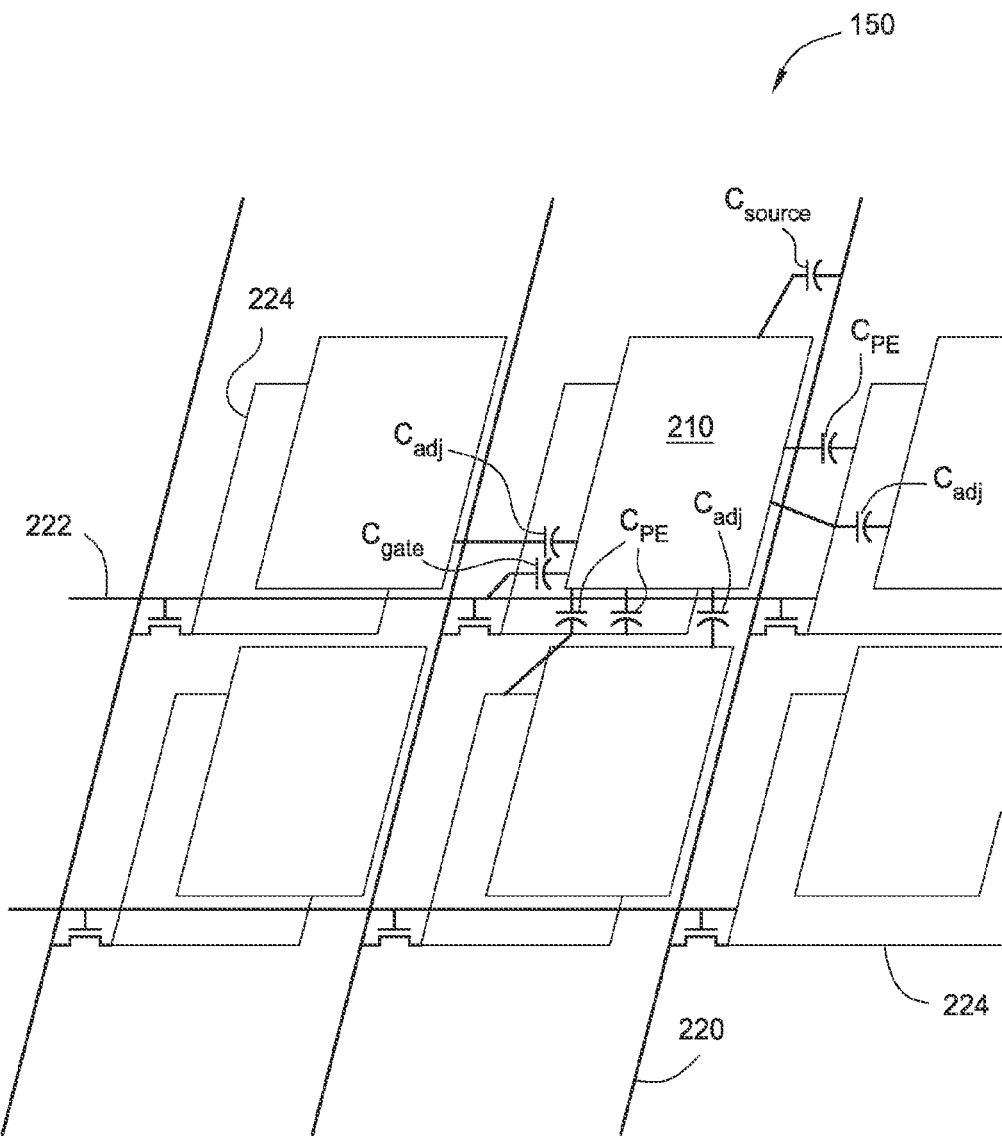
FIG. 2B illustrates various types of parasitic capacitances associated with a sensor electrode in accordance with embodiments of the disclosure.

FIG. 2B illustrates various types of parasitic capacitances associated with a sensor electrode 210 in accordance with embodiments of the disclosure. In the illustrated embodiment, $C_{source}$ represents the parasitic capacitance between the sensor electrode 210 and a source line 220, $C_{adj}$ represents the parasitic capacitance between the sensor electrode 210 and adjacent (or proximate) sensor electrodes 210, $C_{PE}$ represents the parasitic capacitance between the sensor electrode 210 and a pixel electrode 224, and $C_{gate}$ represents the parasitic capacitance between the sensor electrode 210 and a gate line 222. Although several exemplary parasitic capacitances are shown in FIG. 2B, other types of parasitic capacitive couplings, such as a parasitic capacitive coupling between the sensor electrode 210 and other gate lines, source lines, adjacent sensor electrodes, and/or pixel electrodes, are contemplated.

As described above, a parasitic capacitance (e.g., $C_{source}$, $C_{adj}$, $C_{PE}$, and/or $C_{gate}$) may be substantially reduced or eliminated by driving the nearby component (e.g., the source line 220, adjacent sensor electrode 210, pixel electrode 224, and/or gate line 222) with a modulated signal that is similar to a capacitive sensing signal that may be applied to the sensor electrode 210. The modulated signal driven onto the nearby components may be configured such that, during capacitive sensing, the relative voltage between the sensor electrode 210 and the nearby component is substantially constant. In some embodiments, the modulated signal may be similar to the capacitive sensing signal applied to the sensor electrode 210 in at least one of frequency, phase and/or amplitude.

Any practical form of modulation may be applied by a modulated power supply. In some embodiments, the modulation applied by the modulated power supply is a sinusoidal wave having a frequency of between 100 kHz and 500 kHz. In other embodiments, other waveforms and/or frequencies may be applied. In some embodiments, the power supply comprises an isolated power supply. In other embodiments, the power supply comprises a non-isolated power supply.

One benefit of including a modulated power supply in input device 100 may be realized in embodiments of the input device 100 that include a display device 160. In conventional touch screen devices, touch sensing is performed while pixels in the display are not being updated. However, embodiments of the present disclosure in which the input device 100 is integrated with a display device 160 enable touch sensing and display updating to be performed during at least partially overlapping time periods, as described in further detail in conjunction with FIGS. 3A and 3B.

Figure 3A:
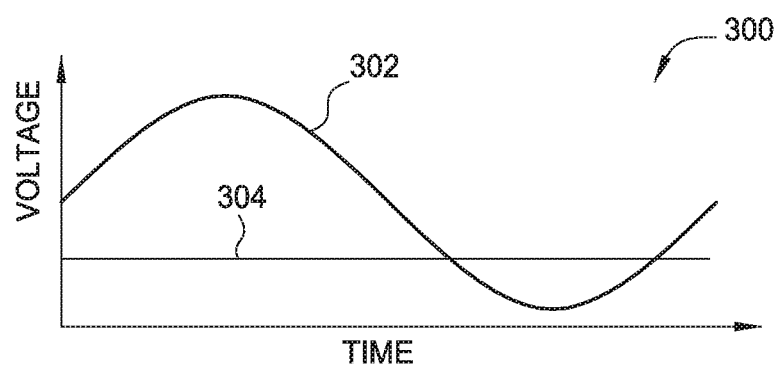
FIG. 3A illustrates a graph depicting operation of a conventional input device in which display updating and capacitive sensing are performed at the same time, but without a modulated power supply.

FIG. 3A illustrates a graph 300 depicting operation of a conventional input device in which display updating and capacitive sensing are performed at the same time, but without a modulated power supply. In a conventional input device that is integrated with a display device, each pixel is typically coupled to both a common electrode and a source line. During display updating, the common electrode is held at a constant voltage ($V_{COM}$), and the source line is driven with a voltage that is selected to achieve a desired pixel brightness, based on the voltage differential between a pixel voltage 304 as driven by the source line and the common electrode. However, when the common electrode is operated for capacitive sensing, $V_{COM}$ is varied as a function of time as shown by the graph of $V_{COM}$ voltage 302. Consequently, because the voltage differential between the source line and the common electrode fluctuates, an incorrect voltage differential would be applied across the pixel if the source line was coupled to the pixel electrode while $V_{COM}$ was driven for capacitive sensing. Thus, display updating and capacitive sensing cannot be performed at the same time using the technique shown in FIG. 3A.

Figure 3B:
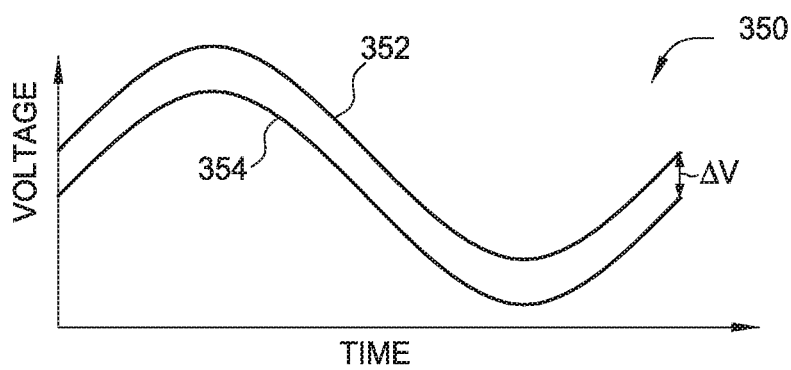
FIG. 3B illustrates a graph depicting operation of an input device in which display updating and capacitive sensing are performed at the same time using a modulated power supply in accordance with embodiments of the disclosure.

FIG. 3B illustrates a graph 350 depicting operation of an input device in which display updating and capacitive sensing are performed at the same time using a modulated power supply in accordance with embodiments of the disclosure. As shown, the graphs for both the $V_{COM}$ voltage 352 and the pixel electrode voltage 354 vary with time at the same frequency. Thus, the voltage differential (indicated by $\Delta V$) between the pixel electrode 354 and $V_{COM}$ voltage 352 remains substantially constant. Accordingly, because $V_{COM}$ varies over time, $V_{COM}$ can be used to perform capacitive sensing, such as by detecting changes to the capacitive coupling between the common electrode and an input object 140, while also reducing parasitic capacitance that may otherwise exist in the input device 100. Additionally, because the voltage differential between the pixel electrode voltage 354 and $V_{COM}$ voltage 352 remains substantially constant, display updating may be performed simultaneously with capacitive sensing, since $V_{COM}$ voltage 352 appears to be constant relative to other electrodes (e.g., the pixel electrodes) included in the input device 100. In some embodiments, display updating is performed simultaneously with capacitive sensing within substantially the same region of the display device 160. In the same or other embodiments, display updating is performed simultaneously with capacitive sensing, but display updating is performed in a region of the display device 160 that is different than the region(s) of the display device 160 that are being driven for capacitive sensing.

As described above, driving a modulated signal onto various components of the input device 100 in order to reduce parasitic capacitance with the sensor electrodes 210 may reduce the overall power consumption of the input device 100. However, in order to further improve power efficiency and/or the quality of modulated signal(s), additional capacitance(s) and/or inductance(s) may be added to the input device 100 in order to create a resonator circuit. Modulated signals may then be provided to the sensor electrodes 210 and/or nearby components (e.g., display components) based on the circuit's resonant frequency. Then, additional power may be provided to the resonator circuit to make up for resistive losses and/or to vary the frequency of the modulated signals. Such techniques are described below in conjunction with FIGS. 4-6.

Resonator Circuit for a Modulated Power Supply

Figure 4:
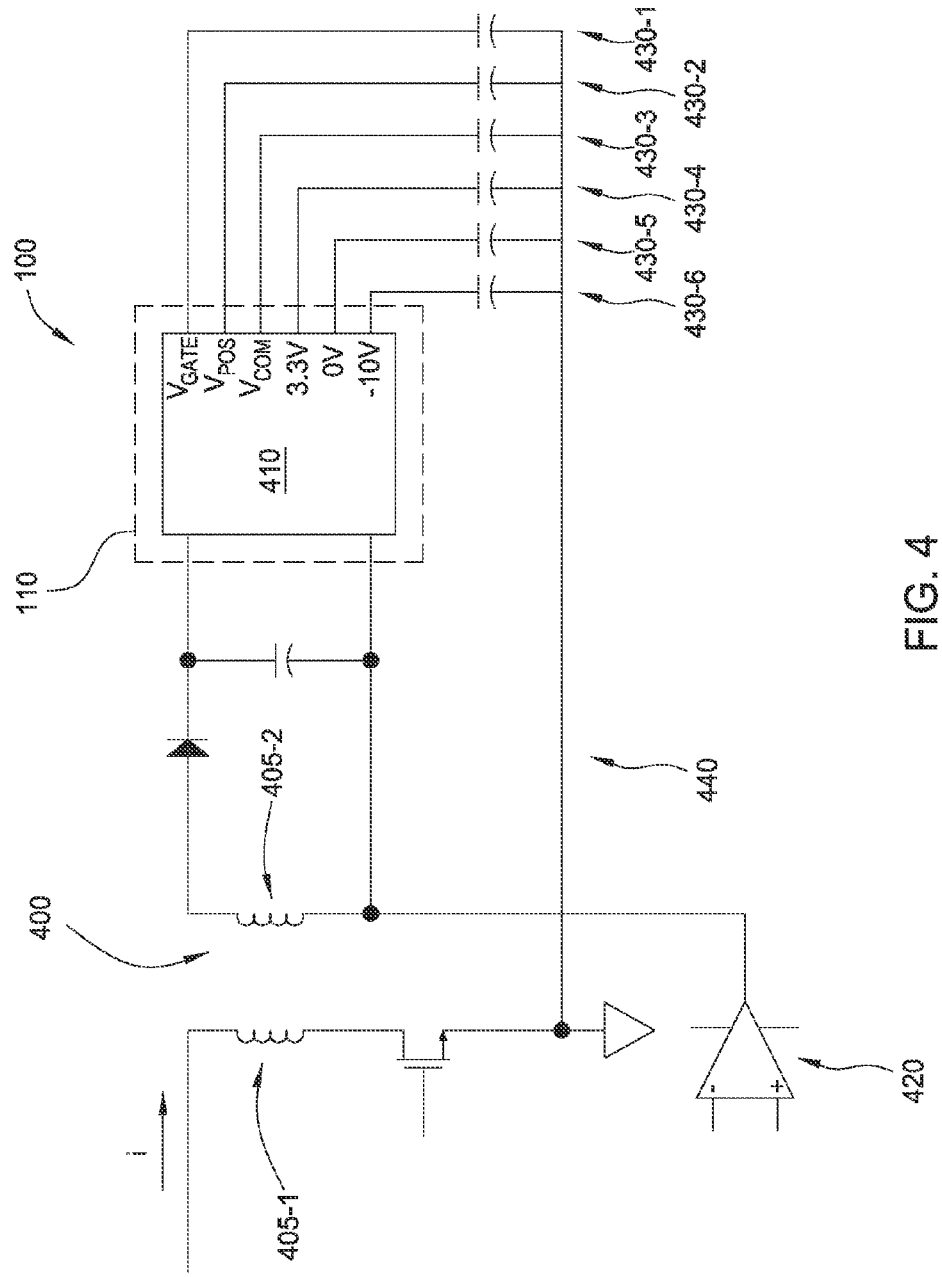
FIG. 4 is a partial schematic view of a power supply included in the input device of FIG. 1 in accordance with embodiments of the disclosure.

FIG. 4 is a partial schematic view of a power supply 400 included in the input device 100 of FIG. 1 in accordance with embodiments of the disclosure. The power supply 400 includes a primary inductor 405-1, a secondary inductor 405-2, and an operational amplifier 420. The power supply 400 is coupled to a power management integrated circuit (PMIC) 410 included in the processing system 110. During operation of the power supply 400, current passes through the primary inductor 405-1, causing a voltage to be induced across the secondary inductor 405-2. The voltage induced across the secondary inductor 405-2 is then applied to the PMIC 410, which supplies power to various display components and/or sensor electrodes 210 included in the input device 100. Additionally, operational amplifier 420 may be used to modulate the ground signal that is supplied to the PMIC 410. Consequently, because the power supply 400 is isolated from other system components, modulating the ground signal applied to the PMIC 410 causes a modulated signal to be outputted by the PMIC 410, as described above. Although the power supply 400 shown in FIGS. 4-5C includes a flyback transformer that isolates the power supply 400 and PMIC 410 from other system components, in other embodiments, any other practical power supply topology may be used.

Although a modulated signal may be applied to the components (e.g., electrodes, traces, etc.) coupled to the PMIC 410—reducing parasitic capacitances between the modulated components—these components may still form a parasitic capacitance with other components included in the input device 100. For example, as shown, a gate electrode included in the input device 100 may form a parasitic capacitive coupling 430-1 with a ground electrode 440 and/or other nearby components. Consequently, when a voltage $V_{GATE}$ (e.g., a modulated signal) is applied to the gate electrode by the PMIC 410, a portion of the energy may be lost to the ground electrode and/or other nearby components. Similarly, when a voltage $V_{POS}$ or $V_{COM}$ (e.g., a modulated signal) is applied to a source line or a common electrode, respectively, parasitic capacitive couplings 430-2 and 430-3 may be formed between the source line or the common electrode and the ground electrode 440 and/or other nearby components.

Accordingly, in various embodiments, one or more additional inductors and, in some embodiments, one or more additional capacitors may be included in the power supply 400 to form a resonator circuit. A modulated signal may then be provided by the power supply 400 by re-injecting, via the additional inductor(s), energy transferred to the ground electrodes 440 by the parasitic capacitances and/or by the additional capacitor(s). The modulated signal may be based on the resonant frequency of the resonator circuit. Thus, in some embodiments, once a sufficient amount of energy has been added to the resonator circuit, modulation of the ground signal may be maintained simply by adding power to the resonator circuit (e.g., via the operational amplifier 420) in order to make up for resistive losses. Several resonator circuit configurations are described below in further detail in conjunction with FIGS. 5A-5C.

Figure 5A:
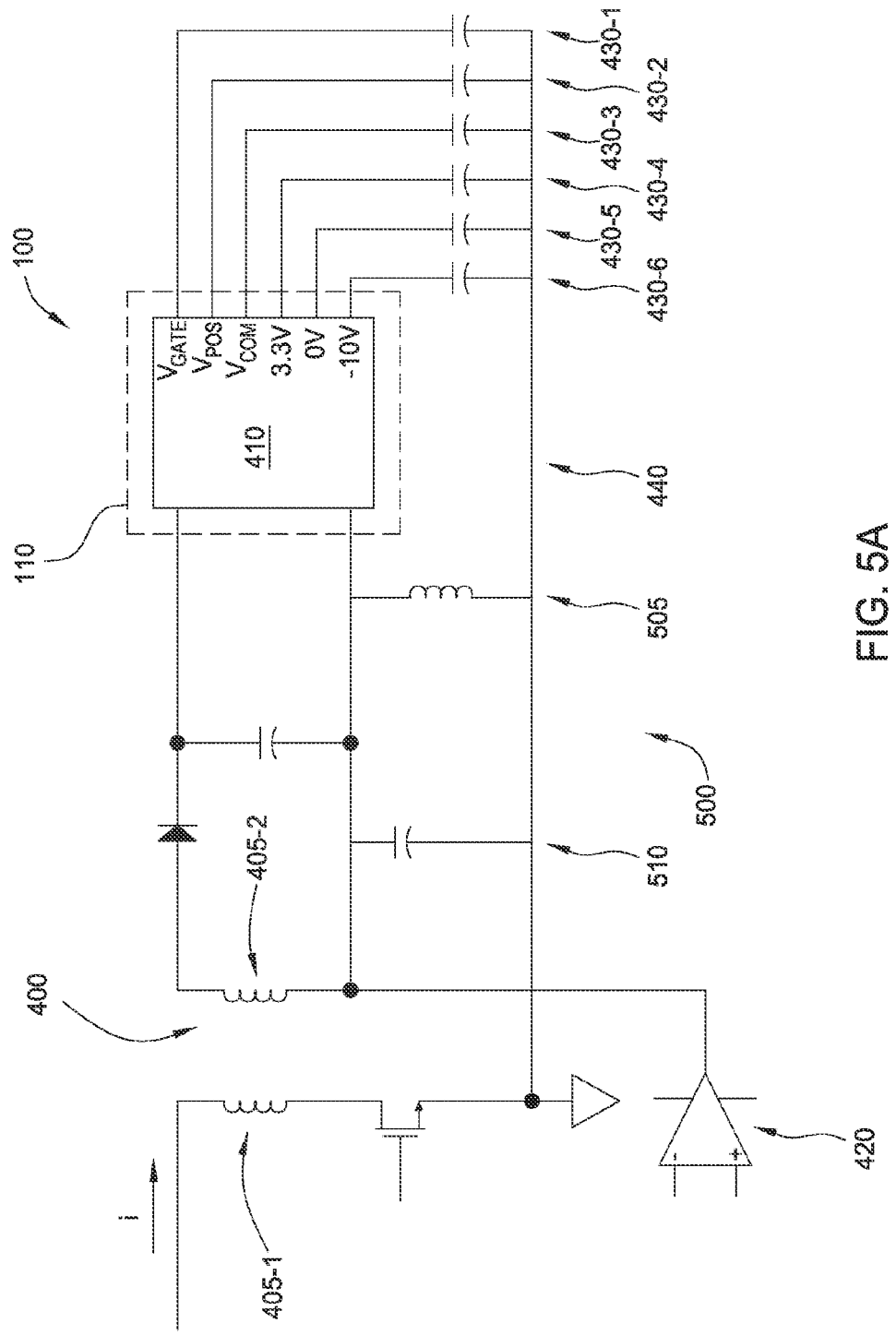
FIG. 5A is a partial schematic view of a resonator circuit that may be included in the power supply of FIG. 4 in accordance with embodiments of the disclosure.

FIG. 5A is a partial schematic view of a resonator circuit 500 that may be included in the power supply 400 of FIG. 4 in accordance with embodiments of the disclosure. The resonator circuit 500 includes a first inductor 505 that is connected in parallel with a first capacitor 510. During operation of the power supply 400, the voltage induced in the secondary inductor 405-2 is applied to the PMIC 410, which provides power to various display components and/or sensor electrodes 210 included in the input device 100. Then, energy transmitted to the ground electrode 440 via the parasitic capacitances 430 and the first capacitor 510 is directed back into the power supply 400 via the first inductor 505 and/or the first capacitor 510. Specifically, when a modulated signal is transmitted from the power supply 400 to the PMIC 410, energy lost through the parasitic capacitances 430 and the first capacitor 510 is stored in and released by the first inductor 505 at the resonant inductor-capacitor (LC) circuit frequency. As described above, the resonant frequency of the resonator circuit 500 is based on the capacitance values of the parasitic capacitances 430 and the first capacitor 510 as well as the inductance value of the first inductor 505.

Furthermore, the response characteristics (e.g., the resonant frequency) of the resonator circuit 500 may be adjusted to match one or more desired characteristics (e.g., frequency) of the modulated signal. For example, the frequency of the modulated signal may be adjusted by selecting an appropriate capacitance value for the first capacitor 510 and/or an appropriate inductance value for the first inductor 505.

In some embodiments, the capacitance of the first capacitor 510 is selected to be at least an order of magnitude greater than the total expected capacitance of the parasitic capacitances (e.g., parasitic capacitances 430) included in the input device 100. Using a first capacitor 510 having a capacitance value that is at least an order of magnitude greater than the parasitic capacitances stabilizes the resonator circuit 500 by decreasing the degree to which fluctuations in the parasitic capacitances (e.g., due to the presence of an input object 140) affect the resonant frequency of the resonator circuit 500.

In addition, in some embodiments, additional energy may be added to and/or removed from the resonator circuit 500 (e.g., via the operational amplifier 420) in order to drive the resonator circuit 500 at a frequency other than the resonant frequency. For example, the resonator circuit 500 may be driven at a non-resonant frequency in order to avoid sources of interference that may occur at certain frequencies in the input device 100. Accordingly, in some embodiments, the capacitance of the first capacitor 510 and/or the inductance of the first inductor 505 may be selected to decrease the quality (Q) of the resonator circuit 500. Decreasing the quality of the resonator circuit 500 may reduce the amount of power required to drive the resonator circuit 500 at non-resonant frequencies. Thus, the frequency at which the resonator circuit 500 is driven may be adjusted (e.g., in order to avoid sources of interference) without significantly increasing power consumption.

In addition to, or instead of, decreasing the quality of the resonator circuit 500 to enable the circuit to be driven at non-resonant frequencies, the inductance and/or capacitance included in the resonator circuit 500 may be dynamically adjusted. Such embodiments are described below in conjunction with FIGS. 5B and 5C.

Figure 5B:
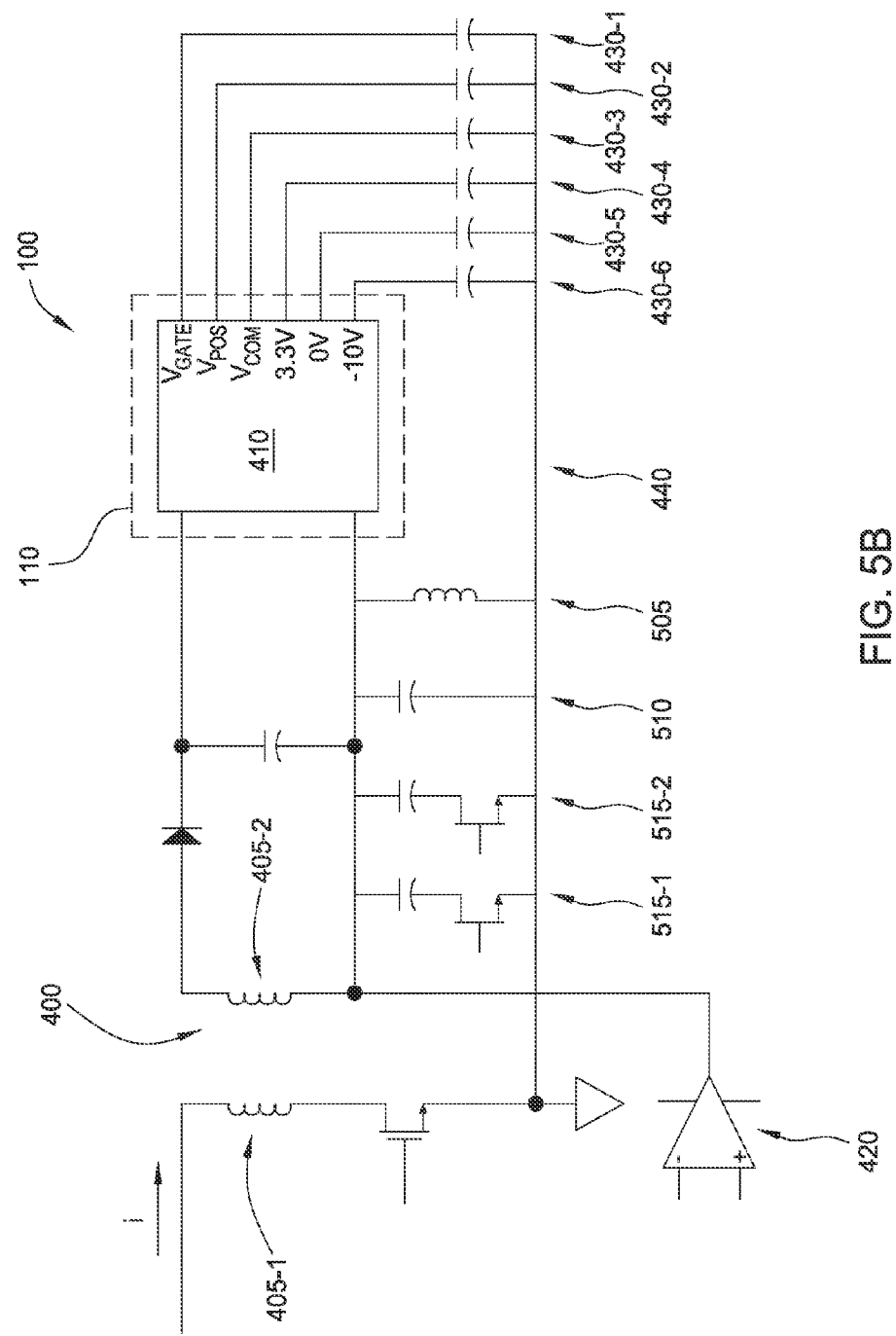
FIG. 5B is a partial schematic view of a variable-capacitance resonator circuit that may be included in the power supply of FIG. 4 in accordance with embodiments of the disclosure.

FIG. 5B is a partial schematic view of a variable-capacitance resonator circuit 502 that may be included in the power supply 400 of FIG. 4 in accordance with embodiments of the disclosure. The variable-capacitance resonator circuit 502 includes a first inductor 505 that is connected in parallel with a first capacitor 510. The resonator circuit 502 further includes a first switchable capacitor 515-1 and a second switchable capacitor 515-2, each of which are coupled between a ground signal of the power supply and a ground electrode 440 of the input device 100.

Each of the first switchable capacitor 515-1 and the second switchable capacitor 515-2 may be switchably coupled to the resonator circuit 502 in order to modify one or more characteristics of the resonator circuit 502. For example, one or both of the first switchable capacitor 515-1 and the second switchable capacitor 515-2 may be connected in parallel with the first inductor 505 in order to modify the resonant frequency of the resonator circuit 502, such as to avoid sources of interference.

Although two switchable capacitors 515, each connected in parallel with the other switchable capacitor 515 and with the first inductor 505, are shown in FIG. 5B, in other embodiments, a greater or lesser number of switchable capacitors 515 may be used. Additionally, the switchable capacitors 515 may connected to the resonator circuit 502 via other topologies and/or may implement other types of switches than those shown in FIG. 5B.

Figure 5C:
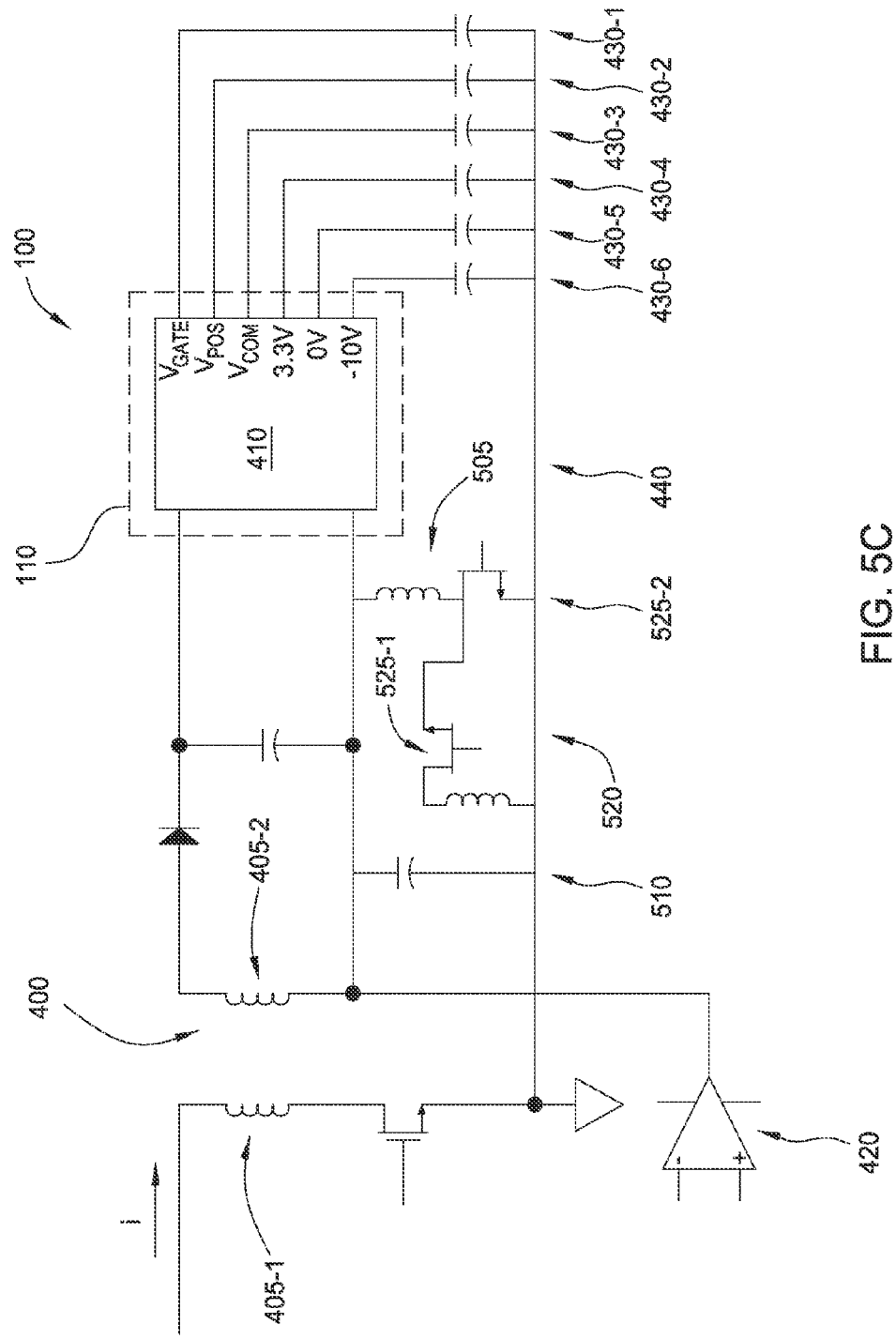
FIG. 5C is a partial schematic view of a variable-inductance resonator circuit that may be included in the power supply of FIG. 4 in accordance with embodiments of the disclosure.

FIG. 5C is a partial schematic view of a variable-inductance resonator circuit 504 that may be included in the power supply 400 of FIG. 4 in accordance with embodiments of the disclosure. The variable-inductance resonator circuit 504 includes a first inductor 505 that is connected in series with a switchable inductor 520. The first inductor 505 and the switchable inductor 520 are also connected in parallel with a first capacitor 510.

The switchable inductor 520 may be switchably coupled to the resonator circuit 504 in order to modify one or more characteristics of the resonator circuit 504. For example, a first switch 525-1 and/or a second switch 525-2 may be used to connect the switchable inductor 520 in series with the first inductor 505 in order to modify the resonant frequency of the resonator circuit 502 (e.g., to avoid sources of interference).

Although a single switchable inductor 520 in series with the first inductor 505 is shown in FIG. 5C, in other embodiments, a greater or lesser number of switchable inductors 520 having other connection topologies and/or implementing other types of switches may be used. Additionally, any of the aspects of the resonator circuit 500, the variable-capacitance resonator circuit 502, and the variable-inductance resonator circuit 504 described above may be combined into a single resonator circuit that may be included in the power supply 400. For example, the resonator circuit may include both one or more switchable capacitor(s) and one or more switchable inductor(s) that are coupled to the resonator circuit via any practical connection topology. Consequently, in some embodiments, the resonant frequency of the resonator circuit included in the power supply 400 may be modified by dynamically adjusting both the capacitance and the inductance present in the resonator circuit.

Figure 6:
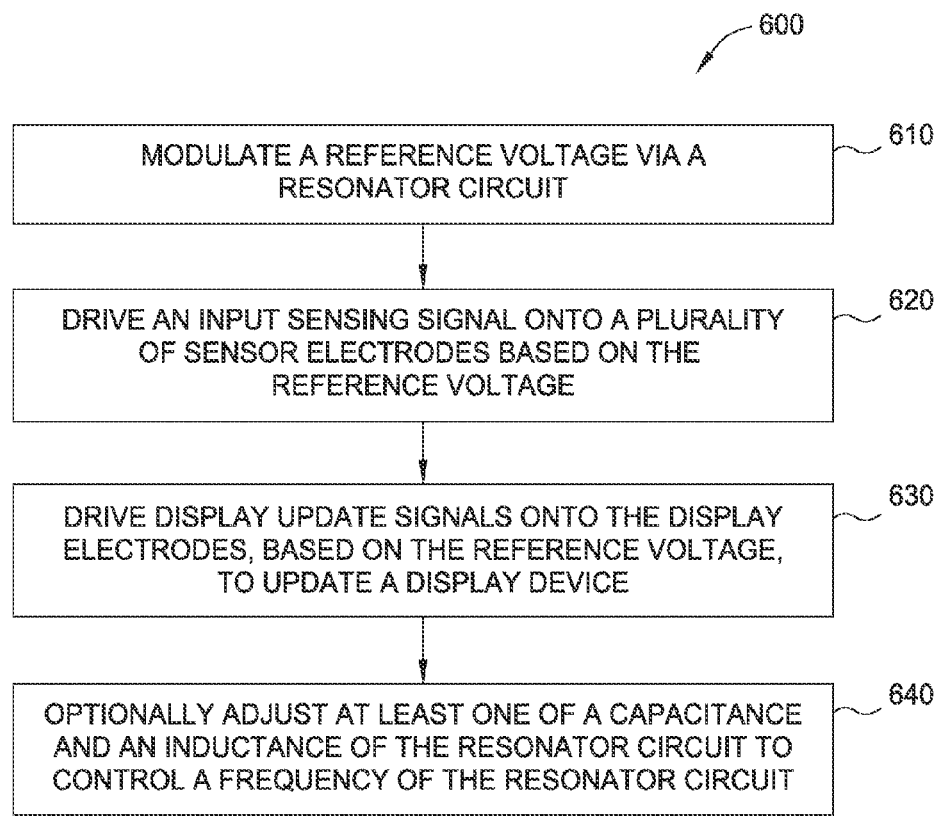
FIG. 6 is a flow chart of a method for performing capacitive sensing using the power supply of FIGS. 4-5C in accordance with embodiments of the disclosure.

FIG. 6 is a flow chart of a method 600 for performing capacitive sensing using the power supply 400 of FIGS. 4-5C in accordance with embodiments of the disclosure. Although the method 600 is described in conjunction with FIGS. 1-5C, persons skilled in the art will understand that any system configured to perform the method, in any appropriate order, falls within the scope of the present disclosure.

The method 600 begins at step 610, where a resonator circuit (e.g., resonator circuit 500, resonator circuit 502, or resonator circuit 504) included in the power supply 400 of the input device 100 modulates a reference voltage associated with the sensor module 204 and/or display driver module 208 to generate a modulated signal (e.g., a sinusoidal signal, square wave, etc.). At step 620, the sensor module 204 and/or display driver module 208 drive a capacitive sensing signal (e.g., a modulated signal) onto one or more sensor electrodes 210 based on the reference voltage. As described above, the sensor electrodes 210 may include one or more common electrodes that are used to perform both display updating and capacitive sensing.

Next, at step 630, the display driver module 208 drives display update signals (e.g. modulated signals) onto one or more display electrodes (e.g., source lines, gate electrodes, common electrodes, etc.) based on the reference voltage. Thus, as described above, both the sensor electrodes 210 and one or more display components may be driven with modulated signals that enable capacitive sensing and display updating to be performed in an overlapping manner. In some embodiments, steps 620 and 630 occur during overlapping time periods. At step 640, the power supply 400 optionally adjusts at least one of a capacitance and an inductance of the resonator circuit in order to modify the resonant frequency of the resonator circuit. The method 600 then optionally returns to step 610.

Thus, the embodiments and examples set forth herein were presented in order to best explain the present invention and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

The invention claimed is:

1. A processing system for a display device comprising an integrated capacitive sensing device, the processing system comprising:
a sensor module configured to be coupled to a plurality of sensor electrodes, each sensor electrode included in the plurality of sensor electrodes comprising at least one display electrode included in a plurality of display electrodes of the display device, wherein the sensor module drives the plurality of sensor electrodes for capacitive sensing during a first period;
a display driver configured to drive display signals onto the display electrodes during a second period, wherein the display signals are based on a reference voltage, and the first period and the second period are at least partially overlapping; and
a power supply configured to provide the reference voltage to the display driver, the power supply comprising a resonator circuit having an inductor connected in parallel with a capacitor, wherein the resonator circuit is configured to modulate the reference voltage.

2. The processing system of claim 1, wherein the resonator circuit is configured to:
modulate the reference voltage during the second period; and
maintain the reference voltage at a substantially constant voltage during a third period.

3. The processing system of claim 2, wherein the display driver is further configured to provide second display signals to the display electrodes during the third period to update a display of the display device, and the second display signals are based on the reference voltage.

4. The processing system of claim 1, wherein driving display signals onto the display electrodes during the second time period updates a display of the display device.

5. The processing system of claim 1, wherein a capacitance of the capacitor is configured to be adjusted to control a frequency of the resonator circuit.

6. The processing system of claim 5, wherein the capacitor comprises a switchable capacitor, and the frequency of the resonator circuit is based on a switch state of the switchable capacitor.

7. The processing system of claim 1, wherein an inductance of the inductor is configured to be adjusted to control a frequency of the resonator circuit.

8. The processing system of claim 7, wherein the inductor comprises a switchable inductor, and the frequency of the resonator circuit is based on a switch state of the switchable inductor.

9. The processing system of claim 7, wherein the inductor comprises a variable inductor having a plurality of tap positions, and the frequency of the resonator circuit is based on a selected tap position of the variable inductor.

10. The processing system of claim 1, wherein the display signals comprise a gate high voltage signal, a gate low voltage signal, a common voltage signal, and a source driver signal.

11. The processing system of claim 1, wherein the resonator circuit modulates the reference voltage based on a signal from the sensor module.

12. The processing system of claim 1, wherein the sensor module is configured to drive at least one sensor electrode included in the plurality of sensor electrodes with a capacitive sensing signal having a frequency that is substantially the same as a frequency of the reference voltage.

13. A display device comprising an integrated capacitive sensing device, the display device comprising:
a plurality of sensor electrodes, each sensor electrode included in the plurality of sensor electrodes comprising at least one display electrode included in a plurality of display electrodes of the display device;
a processing system coupled to the plurality of sensor electrodes and configured to:
drive the plurality of sensor electrodes for capacitive sensing during a first period; and
drive display signals onto the display electrodes during a second period, wherein the display signals are based on a reference voltage, and the first period and the second period are at least partially overlapping; and
a power supply configured to provide the reference voltage to the processing system, the power supply comprising a resonator circuit having an inductor connected in parallel with a capacitor, wherein the resonator circuit is configured to modulate the reference voltage.

14. The display device of claim 13, wherein:
the resonator circuit is configured to:
modulate the reference voltage during the second period; and maintain the reference voltage at a substantially constant voltage during a third period; and the processing system is further configured to provide second display signals to the display electrodes during the third period to update a display of the display device, wherein the second display signals are based on the reference voltage.

15. The display device of claim 13, wherein driving display signals onto the display electrodes during the second time period updates a display of the display device.

16. The display device of claim 13, wherein the processing system is configured to adjust a capacitance of the capacitor to control a frequency of the resonator circuit.

17. The display device of claim 16, wherein the capacitor comprises a switchable capacitor, and the frequency of the resonator circuit is based on a switch state of the switchable capacitor.

18. The display device of claim 13, wherein the processing system is configured to adjust an inductance of the inductor to control a frequency of the resonator circuit.

19. The display device of claim 18, wherein the inductor comprises a switchable inductor, and the frequency of the resonator circuit is based on a switch state of the switchable inductor.

20. The display device of claim 18, wherein the inductor comprises a variable inductor having a plurality of tap positions, and the frequency of the resonator circuit is based on a selected tap position of the variable inductor.

21. The display device of claim 13, wherein the display update signals comprise a gate high voltage signal, a gate low voltage signal, a common voltage signal, and a source driver signal.

22. A method of performing display updating with a display device comprising an integrated capacitive sensing device, the method comprising:

driving a capacitive sensing signal onto a plurality of sensor electrodes during a first period, each sensor electrode included in the plurality of sensor electrodes comprising at least one display electrode included in a plurality of display electrodes of the display device;

modulating a reference voltage via a resonator circuit, the resonator circuit having an inductor connected in parallel with a capacitor;

adjusting at least one of a capacitance of the capacitor and an inductance of the inductor to control a frequency of the resonator circuit; and driving display update signals onto the display electrodes to update the display device during a second period, wherein the display signals are based on the reference voltage, and the first period and the second period are at least partially overlapping.

23. The method of claim 22, further comprising:

modulating the reference voltage during the second period;

maintaining the reference voltage at a substantially constant voltage during a third period; and providing second display signals to the display electrodes during the third period to update a display of the display device, wherein the second display signals are based on the reference voltage.

24. The method of claim 22, further comprising driving display signals onto the display electrodes during the second time period updates a display of the display device.

* * * * *